United States Patent
Ota et al.

(10) Patent No.: US 11,125,249 B2
(45) Date of Patent: Sep. 21, 2021

(54) COOLING FAN APPARATUS

(71) Applicant: Mitsuba Corporation, Gunma (JP)

(72) Inventors: Hidetake Ota, Kiryu (JP); Tomonari Fujii, Kiryu (JP); Hiroki Nagase, Kiryu (JP)

(73) Assignee: Mitsuba Corporation, Gunma (JP)

( * ) Notice: Subject to any disclaimer, the term of this patent is extended or adjusted under 35 U.S.C. 154(b) by 3 days.

(21) Appl. No.: 16/085,795

(22) PCT Filed: Mar. 22, 2017

(86) PCT No.: PCT/JP2017/011429
§ 371 (c)(1),
(2) Date: Sep. 17, 2018

(87) PCT Pub. No.: WO2017/170029
PCT Pub. Date: Oct. 5, 2017

(65) Prior Publication Data
US 2019/0085866 A1    Mar. 21, 2019

(30) Foreign Application Priority Data
Mar. 30, 2016  (JP) .............................. JP2016-067288

(51) Int. Cl.
*F04D 29/54*    (2006.01)
*F01P 11/10*    (2006.01)
(Continued)

(52) U.S. Cl.
CPC .............. *F04D 29/545* (2013.01); *F01P 5/06* (2013.01); *F01P 11/10* (2013.01); *B60H 1/00464* (2013.01); *F04D 19/002* (2013.01)

(58) Field of Classification Search
CPC ........ F04D 29/40; F04D 29/403; F04D 29/52; F04D 29/54; F04D 29/541; F04D 29/545; F04D 29/547; F04D 29/56; F01P 11/10
See application file for complete search history.

(56) References Cited

U.S. PATENT DOCUMENTS 1,586,534 A  *  6/1926  Pipenhagen .............. F01P 7/12
                                                   236/35.2
4,756,279 A  *  7/1988  Temmesfeld ............ F01P 11/10
                                                   123/198 E
(Continued)

FOREIGN PATENT DOCUMENTS

JP    61043929 U    3/1986
JP    01129589 U    9/1989
(Continued)

OTHER PUBLICATIONS

PCT Office, International Search Report issued in PCT/JP2017/011429 dated Jun. 6, 2017, 4 pages.

*Primary Examiner* — Courtney D Heinle
*Assistant Examiner* — Sang K Kim
(74) *Attorney, Agent, or Firm* — Wood Herron & Evans LLP

(57) ABSTRACT

A cooling-fan-apparatus fan shroud includes: a cover wall that closes a space between a heat exchanger and a circumference of a fan; and a passing permitting frame part that is positioned between the fan and an attachment part to a vehicle at an outer side of the cover wall and that allows free passing of traveling air, wherein a reinforcement rib is provided at an opening of the passing permitting frame part, and at least part of the reinforcement rib is a deflection louver that guides the traveling air to a predetermined direction.

14 Claims, 5 Drawing Sheets

(51) Int. Cl.
*F01P 5/06* (2006.01)
*B60H 1/00* (2006.01)
*F04D 19/00* (2006.01)

(56) References Cited

U.S. PATENT DOCUMENTS

| | | | | |
|---|---|---|---|---|
| 7,603,968 | B2* | 10/2009 | Pantow | B60K 11/02 |
| | | | | 123/41.04 |
| 8,182,217 | B2* | 5/2012 | Schaffer | F01P 5/06 |
| | | | | 415/214.1 |
| 2004/0253566 | A1* | 12/2004 | Quinn | B60H 1/249 |
| | | | | 434/162 |
| 2005/0217907 | A1 | 10/2005 | Madson et al. | |
| 2005/0249587 | A1* | 11/2005 | Paulsen | F04D 25/14 |
| | | | | 415/146 |
| 2014/0150914 | A1* | 6/2014 | Havel | B60K 11/08 |
| | | | | 138/109 |
| 2018/0003101 | A1* | 1/2018 | Kondou | F01P 11/10 |

FOREIGN PATENT DOCUMENTS

| | | |
|---|---|---|
| JP | 03037234 U | 4/1991 |
| JP | 09144540 A | 6/1997 |
| JP | 2008106802 A | 5/2008 |

* cited by examiner

REARWARD IN PROCEEDING DIRECTION ↔ FRONTWARD IN PROCEEDING DIRECTION

COOLING FAN APPARATUS

TECHNICAL FIELD

The present invention relates to a fan shroud of a cooling fan apparatus such as a radiator.

Priority is claimed on Japanese Patent Application No. 2016-067288 filed on Mar. 30, 2016, the contents of which are incorporated herein by reference.

BACKGROUND

In a general vehicle, an engine room is provided at a frontward position of a vehicle room. An engine is provided in the engine room, and in-vehicle heat exchangers such as a radiator and a condenser are arranged at a front end part of the engine. Further, a cooling fan apparatus that allows cooling air to forcibly flow through the in-vehicle heat exchanger is provided so as to face ventilation surfaces of the in-vehicle heat exchangers.

The cooling fan apparatus generates forcing cooling air that passes through the heat exchanger such as the radiator by the rotation of a fan. The cooling fan apparatus includes, in addition to the fan, a fan shroud and a motor that drives the fan. The fan shroud has a structure so as to cover the heat exchanger such as the radiator and has a circular opening part at which the fan and the motor are arranged at a center of the circular opening part. The circumference of the circular opening part is a cover wall that covers most of the ventilation surface of the heat exchanger, and a space between the circumference of the fan and the radiator is closed by the cover wall.

In the fan shroud of the related art, most of a part of the radiator that corresponds to the circular opening part of the vehicle is covered by the cover wall (for example, refer to Patent Document 1).

RELATED ART DOCUMENTS

Patent Documents

[Patent Document 1] Japanese Unexamined Patent Application, First Publication No. 2008-106802

SUMMARY OF INVENTION

Problems to be Solved by the Invention

Therefore, although there is no problem when the cooling fan apparatus is in an ON time (hereinafter, referred to as a "fan ON time"), there is a possibility that a part through which it becomes difficult for traveling air to pass may occur when the cooling fan apparatus is in an OFF time (hereinafter, referred to as a "fan OFF time").

That is, the fan is made to be in an OFF state during traveling at a middle or high speed, and the cooling of the heat exchanger such as the radiator is performed only by the traveling air. At that time, the fan shroud becomes a wall, the ventilation of the traveling air becomes worse, it is impossible to efficiently cool a part (an intercooler and the like) which is desired to be cooled, and there is a possibility that the cooling effect becomes worse.

An object of the present invention is to provide a fan shroud of a cooling fan apparatus capable of enhancing a cooling effect of a required part by air ventilation at the time of traveling without blocking the air ventilation.

Means for Solving the Problem

In order to solve the problem described above, according to a first aspect of the present invention, a cooling-fan-apparatus fan shroud is attached to a vehicle and is a fan shroud of a cooling fan apparatus that generates, by a rotation of a fan, forcing cooling air which passes through a heat exchanger that is arranged at a front part of a vehicle, the cooling-fan-apparatus fan shroud including: a cover wall that has a circular opening part at which the fan is arranged at a center and that closes a space between the heat exchanger and a circumference of the fan by covering most of a ventilation surface of the heat exchanger; an attachment part that is provided on an outer side of the cover wall and that fixes the cover wall to the vehicle; and a passing permitting frame part that is positioned between the fan and the attachment part and that allows free passing of traveling air which flows from a frontward direction to a rearward direction in accordance with traveling of the vehicle, wherein a deflection louver that guides the traveling air to a predetermined direction is provided on the passing permitting frame part.

According to this configuration, since the passing permitting frame part that allows free passing of the traveling air is provided on the outer side of the cover wall, even at a fan OFF time, by the blowing-through of the traveling air, it is possible to deliver a sufficient amount of air to a required part, and it is possible to enhance the cooling effect. Further, since the deflection louver is provided on the passing permitting frame part, by the setting of the position and the direction of the deflection louver, it is possible to control the flowing direction of the traveling air.

According to a second embodiment of the present invention, in the cooling-fan-apparatus fan shroud according to the first aspect of the present invention, the deflection louver is provided so as to be capable of changing a direction to which traveling air is guided.

According to this configuration, by the adjustment of the direction of the deflection louver, it is possible to guide the traveling air that passes through the passing permitting frame part in a required direction.

According to a third embodiment of the present invention, in the cooling-fan-apparatus fan shroud according to the first aspect of the present invention, the deflection louver is formed in a plate shape, and a cross-sectional shape along a proceeding direction of the vehicle is formed so as to extend to be directed along the proceeding direction at a frontward position in the proceeding direction and so as to be bent and extend to be directed along a direction that crosses with the proceeding direction from a middle position in the proceeding direction.

According to this configuration, when the traveling air passes through the passing permitting frame part, it is possible to smoothly introduce the traveling air into the passing permitting frame part at the frontward position in the proceeding direction of the passing permitting frame part.

It is assumed that the deflection louver is formed in a simply flat plate shape and is arranged along the direction that crosses with respect to the proceeding direction. In such a case, at the frontward position in the proceeding direction of the passing permitting frame part, the traveling air collides with the deflection louver, and a turbulence flow (swirl flow) occurs. When the turbulence flow occurs, the passing-through property of the traveling air in the passing permitting frame part is degraded.

However, the deflection louver is formed to be bent as described above, and thereby, it is possible to prevent the occurrence of the turbulence flow at the frontward position in the proceeding direction of the passing permitting frame part. Therefore, the passing-through property of the traveling air in the passing permitting frame part is improved, and it is also possible to increase the amount of traveling air that passes through the passing permitting frame part. As a result, it is possible to enhance the cooling effect of the cooling fan apparatus.

According to a fourth aspect of the present invention, in the cooling-fan-apparatus fan shroud according to the first aspect of the present invention, the deflection louver is formed in a plate shape and is formed such that, in a cross-sectional shape along a proceeding direction of the vehicle, a thickness is set to be maximized at a more frontward position in the proceeding direction than a middle position in the proceeding direction, and a thickness is gradually thinned from the position at the maximum thickness toward frontward and rearward directions in the proceeding direction.

In a case where the deflection louver has a simply flat plate shape having a uniform thickness, when the traveling air passes through the deflection louver, a turbulence flow easily occurs at a rearward position in the proceeding direction of the deflection louver.

However, by changing the thickness in the deflection louver as described above, it is possible to prevent the occurrence of the turbulence flow due to the passing-through of the traveling air at the rearward position in the proceeding direction of the deflection louver. Therefore, the passing-through property of the traveling air in the passing permitting frame part is improved, and it is also possible to increase the amount of traveling air that passes through the passing permitting frame part.

According to a fifth aspect of the present invention, in the cooling-fan-apparatus fan shroud according to any one of the first aspect to the fourth aspect of the present invention, the passing permitting frame part is provided at a position that faces a ventilation surface of the heat exchanger.

According to this configuration, since the passing permitting frame part is provided at a position that faces a ventilation surface of the heat exchanger, it is possible to improve the cooling performance of the heat exchanger by the air ventilation at the fan OFF time.

According to a sixth aspect of the present invention, in the cooling-fan-apparatus fan shroud according to any one of the first aspect to the fifth aspect of the present invention, the passing permitting frame part is formed in a frame shape that includes, on an inner side, an opening which allows the traveling air to pass, a reinforcement rib is provided at the opening so as to intersect the opening, and at least part of the reinforcement rib is configured as the deflection louver that guides the traveling air which passes through the opening to a predetermined direction.

According to this configuration, it is possible to improve the air ventilation at the fan OFF time while increasing the strength of the passing permitting frame part that is formed in a frame shape.

According to a seventh aspect of the present invention, in the cooling-fan-apparatus fan shroud according to the sixth aspect of the present invention, a strength reinforcement plate part is provided on a portion of a part that is surrounded by a plurality of the reinforcement ribs and a portion of a part that is surrounded by a plurality of the reinforcement ribs and an outer circumference frame portion of the passing permitting frame part.

According to this configuration, it is possible to enhance the rigidity of the fan shroud by the strength reinforcement plate part.

Advantage of the Invention

According to the cooling-fan-apparatus fan shroud described above, even at a fan OFF time, by the blowing-through of the traveling air, it is possible to deliver a sufficient amount of air to a required part, and it is possible to enhance the cooling effect. Further, by the setting of the position and the direction of the deflection louver, it is possible to control the flowing direction of the traveling air.

DESCRIPTION OF THE EMBODIMENTS

Next, an embodiment of the present invention will be described with reference to the drawings.

Figure 1:
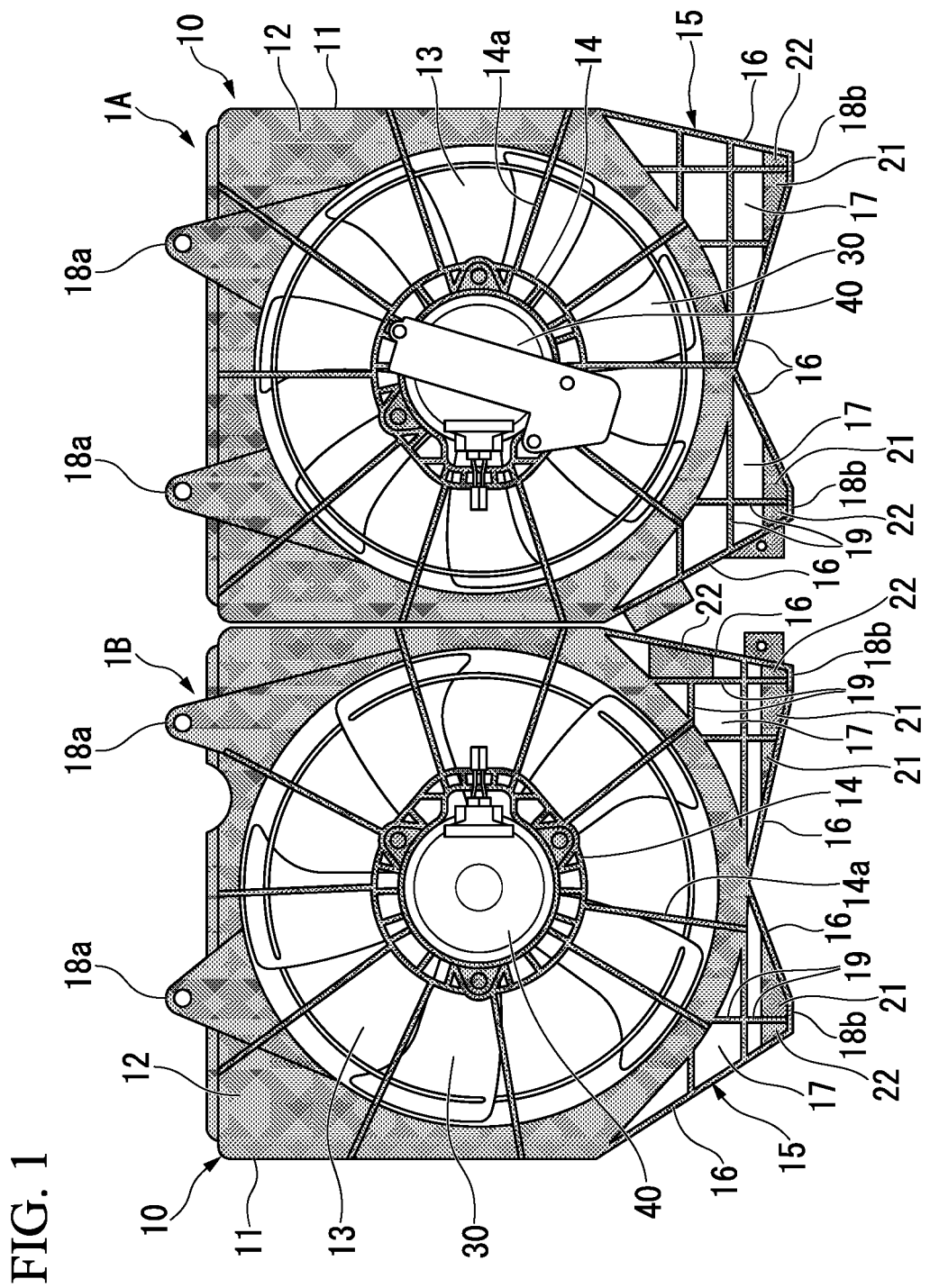
FIG. 1 is a front view of a cooling fan apparatus that includes a fan shroud in an embodiment of the present invention.
Figure 2:
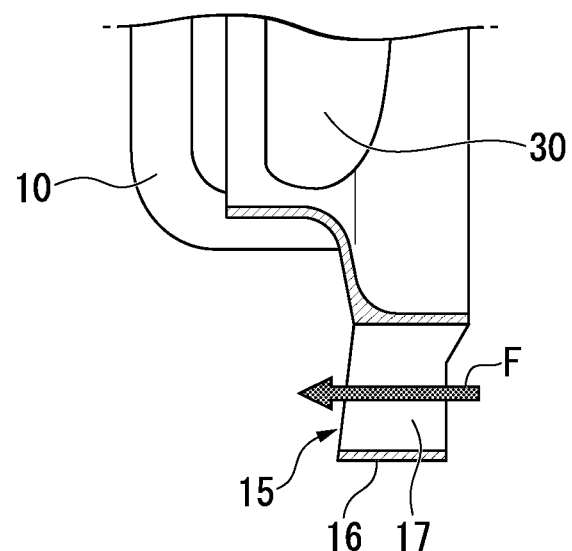
FIG. 2 is a view showing an air ventilation action of the cooling fan apparatus in the embodiment of the present invention.
Figure 3:
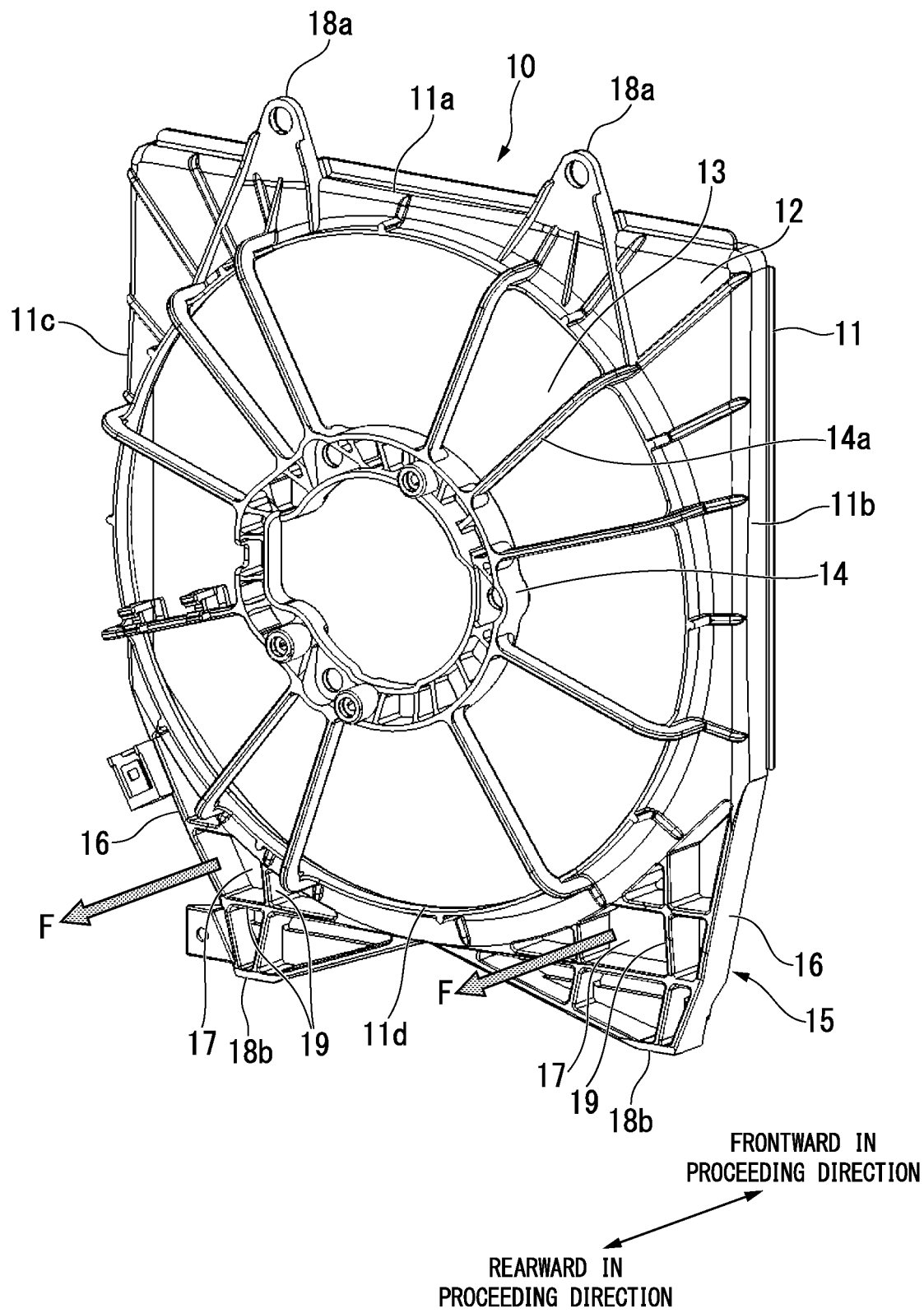
FIG. 3 is a view showing a configuration and an action of a deflection louver of the cooling fan apparatus in the embodiment of the present invention.
Figure 4:
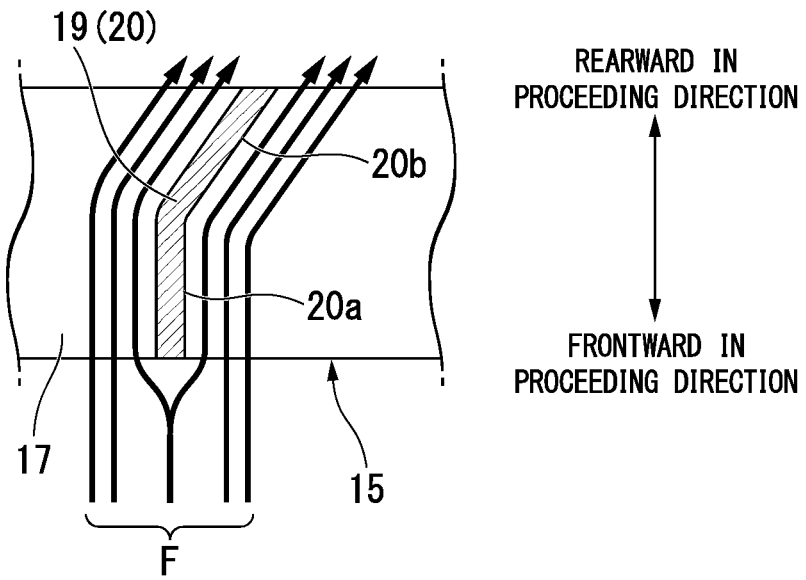
FIG. 4 is a perspective view seen from an inner side of a fan shroud of the cooling fan apparatus in the embodiment of the present invention.
Figure 5:
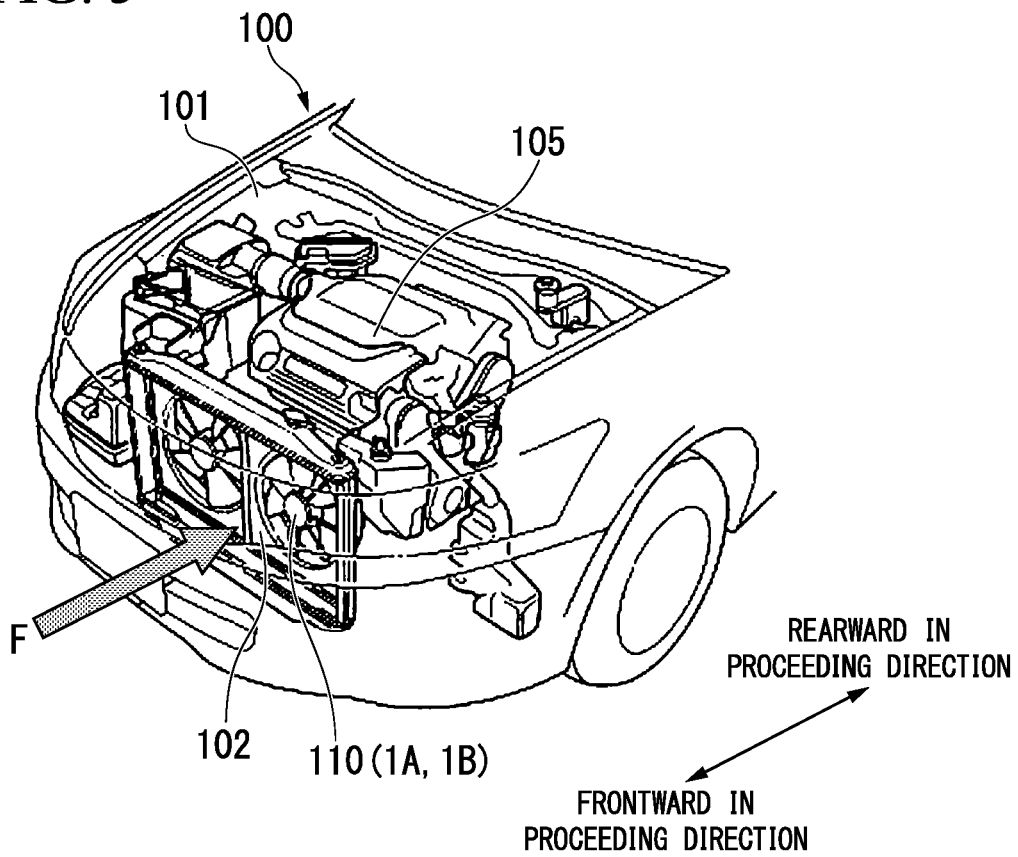
FIG. 5 is a perspective view showing an example of a structure of a vehicle engine room that includes the cooling fan apparatus in the embodiment of the present invention.

FIG. 1 is a front view of a cooling fan apparatus 110 that includes a fan shroud 10 according to the present invention, FIG. 2 is a view showing an air ventilation action in the cooling fan apparatus 110, FIG. 3 is a view showing a configuration and an action of a deflection louver 20 in the cooling fan apparatus 110, FIG. 4 is a perspective view seen from an inner side of the fan shroud 10, and FIG. 5 is a perspective view showing an example of a structure of an engine room 101 of a vehicle 100 that includes the cooling fan apparatus 110.

The cooling fan apparatus 110 is used for cooling an in-vehicle heat exchanger 102 such as a radiator and a condenser of a vehicle.

(Arrangement of Cooling Fan Apparatus in Vehicle)

First, with reference to FIG. 5, a vehicle 100 on which cooling fan apparatuses 1A, 1B are provided is described.

In the vehicle 100, an engine 105 is provided in the engine room 101 at a frontward position of a vehicle room, and the in-vehicle heat exchanger 102 is provided at a frontward position of the engine 105. Further, cooling fan apparatuses 110 (1A, 1B) that allow forcing cooling air to flow to the in-vehicle heat exchanger 102 are provided so as to face a ventilation surface of the in-vehicle heat exchanger 102.

In the following description, a frontward direction in a proceeding direction of the vehicle 100 may be simply referred to as a frontward direction in a proceeding direction, and a rearward direction in a proceeding direction of the vehicle 100 may be simply referred to as a rearward direction in a proceeding direction. Further, in the following description, traveling air F (refer also to FIG. 5) refers to wind that is generated when the vehicle 100 travels toward the frontward direction in the proceeding direction, and the direction of the wind of the traveling air F is a direction that is directed from the frontward direction in the proceeding direction to the rearward direction in the proceeding direction.

(Cooling Fan Apparatus)

In the example shown in FIG. 1, two cooling fan apparatuses 1A, 1B are arranged side by side in response to a case where two heat exchangers (not shown) such as a radiator and a condenser are arranged side by side. The two cooling fan apparatuses 1A, 1B have substantially the same configuration except for part of the configuration. The cooling fan apparatuses 1A, 1B generate forcing cooling air that passes through the heat exchanger such as a radiator by the rotation of a fan 30. The cooling fan apparatuses 1A, 1B include: a motor 40 that drives the fan 30; and a fan shroud 10 in addition to the fan 30.

(Fan Shroud)

The fan shroud 10 is a plastic molded component having a structure so as to cover the heat exchanger such as the radiator and has a circular opening part 13 at which the fan 30 and the motor 40 are arranged at a center of the circular opening part 13. The circumference of the circular opening part 13 is a cover wall 12 having a size that covers most of the ventilation surface of the heat exchanger, and a space between the circumference of the fan 30 and the radiator is closed by the cover wall 12.

A configuration of the fan shroud 10 is described in detail mainly with reference to FIG. 3.

The fan shroud 10 has an outer frame part 11 having a band plate shape along the outer circumference profile. The shape of the outer frame part 11 when seen from the axis line direction defines substantially a square shape, and only the lower side is formed in an arc shape that protrudes downward. The cover wall 12 having the circular opening part 13 at the center is provided on an inner side of the outer frame part 11. That is, a bent piece having a band plate shape to the axis line direction is provided in a connected manner on the outer circumferential edge of the cover wall 12, and thereby, the outer frame part 11 having a substantially square shape of which only the lower side defines an arc shape is formed. In detail, the outer frame part 11 is formed of an upper side portion 11a, a left side portion 11b, a right side portion 11c, and a lower side portion 11d that is bent in an arc shape so as to protrude downward.

Further, a motor attachment frame 14 having an annular shape is provided at the center of the circular opening part 13 of the cover wall 12. The motor attachment frame 14 having an annular shape is supported at the center of the circular opening part 13 of the cover wall 12 via a plurality of stays 14a. The plurality of stays 14a extend radially from an outer circumference of the motor attachment frame 14, and front ends of the plurality of stays 14a are joined to a circumferential edge portion of the circular opening part 13 of the cover wall 12. The motor 40 is attached to such a motor attachment frame 14.

(Cover Wall and Passing Permitting Frame Part)

The cover wall 12 is a part that corresponds to a wall plate which closes a space between the heat exchanger and the circumference of the fan 30 by covering most of the ventilation surface of the heat exchanger. In the cover wall 12, a passing permitting frame part 15 that allows free passing of the traveling air F which flows from a frontward direction to a rearward direction in accordance with the traveling of the vehicle is provided on a lower side of the cover wall 12. The passing permitting frame part 15 is arranged on an outer side of the outer frame part 11 that is positioned at the outer circumferential edge of the cover wall 12.

The passing permitting frame part 15 includes: an outer circumference frame 16 that has a rectangular frame shape and that forms an opening 17 that allows passing of the traveling air F on the inner side; and a reinforcement rib 19 that has a longitudinal and transverse crosspiece shape and that is provided on the opening 17 of the outer circumference frame 16 so as to intersect the opening 17. A plurality of attachment parts 18a, 18b that fix the fan shroud 10 to the vehicle are provided on an upper end portion of the outer frame part 11 and a lower end portion of the outer circumference frame 16. Thereby, the passing permitting frame part 15 becomes a state of being positioned between the fan 30 and the attachment part 18b. Further, the passing permitting frame part 15 is provided at a position that corresponds to an opening of a vehicle frontward part, specifically, at a position that faces the ventilation surface of the heat exchanger.

Further, as shown in FIG. 4, at least part of the reinforcement rib 19 is formed as a deflection louver 20 that guides the traveling air F which passes through the opening 17 of the passing permitting frame part 15 to a predetermined direction.

The deflection louver 20 is formed in a plate shape. Further, the deflection louver 20 is formed as described below in a cross-section along the proceeding direction and the vertical direction. That is, a more frontward part of the deflection louver 20 than substantially the middle in the proceeding direction defines a first louver part 20a that extends along the proceeding direction. Further, a more rearward part of the deflection louver 20 than substantially the middle in the proceeding direction defines a second louver part 20b that is bent to extend along a direction that crosses with the proceeding direction. The first louver part 20a and the second louver part 20b are integrally molded to form the deflection louver 20.

Further, as shown in FIG. 1, a strength reinforcement plate part 21 is integrally molded on the passing permitting frame part 15 at a lower position in the vertical direction of a portion that is surrounded by the reinforcement rib 19. Further, a strength reinforcement plate part 22 is integrally molded on the passing permitting frame part 15 at an arbitrary position of a portion that is surrounded by the outer circumference frame 16 and the reinforcement rib 19. More specifically, the strength reinforcement plate part 22 is arranged at a lower position in the vertical direction and at a somewhat higher position than the lower position of the portion that is surrounded by the outer circumference frame 16 and the reinforcement rib 19.

In this way, in the fan shroud 10 in the embodiment described above, the passing permitting frame part 15 that allows free passing of the traveling air F is provided on the outer side of the cover wall 12. Therefore, even at a fan OFF time, by the blowing-through of the traveling air F, it is possible to deliver a large amount of air to a required part (for example, an intercooler and the like). Therefore, it is possible to enhance the cooling effect. Further, since the reinforcement rib 19 having a function of the deflection louver 20 is provided on the passing permitting frame part 15, by changing the position and the direction of the reinforcement rib 19 that functions as the deflection louver 20, it is possible to control the flowing direction of the traveling air F, and it is possible to efficiently cool a part (for example, the vicinity of a battery, the vicinity of a motor, and the like) which is desired to be cooled.

The deflection louver 20 is formed in a plate shape. Further, in the cross-section along the proceeding direction and the vertical direction, a more frontward part of the deflection louver 20 than substantially the middle in the proceeding direction defines the first louver part 20a that extends along the proceeding direction. Further, a more rearward part of the deflection louver 20 than substantially the middle in the proceeding direction defines the second louver part 20b that is bent to extend along a direction that crosses with the proceeding direction.

Therefore, when the traveling air F passes through the passing permitting frame part 15, it is possible to smoothly introduce the traveling air F into the passing permitting frame part 15 at the frontward position in the proceeding direction of the passing permitting frame part 15. Hereinafter, this is described in detail.

Figure 6:
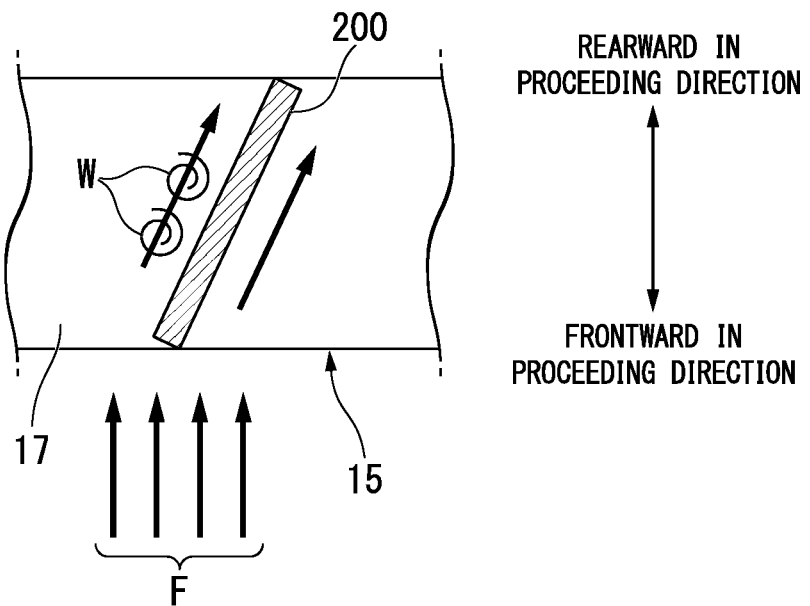
FIG. 6 is a view showing a louver of the related art.

FIG. 6 is a view showing a louver 200 of an example of the related art describing the effect of the deflection louver 20 and corresponds to FIG. 4 described above.

As shown in FIG. 6, as in the related art, it is assumed that a louver 200 having a simply flat plate shape is arranged along the direction that crosses with respect to the proceeding direction. In such a case, at the frontward position in the proceeding direction of the louver 200, the traveling air F collides with the louver 200, and further, detachment of the traveling air F from the louver 200 is also prompted. As a result, a turbulence flow (swirl flow) W occurs. When the turbulence flow W occurs, the passing-through property of the traveling air F in the passing permitting frame part 15 is degraded.

On the other hand, as shown in FIG. 4, the deflection louver 20 of the embodiment described above is bent and formed of the first louver part 20a and the second louver part 20b. Further, the first louver part 20a extends along the proceeding direction, and therefore, the traveling air F does not collide with the first louver part 20a. Therefore, it is possible to prevent the occurrence of the turbulence flow W at the frontward position in the proceeding direction of the first louver part 20a. As a result, it is possible to smoothly introduce the traveling air F into the passing permitting frame part 15, and it is possible to improve the passing-through property of the traveling air F in the passing permitting frame part 15. Further, it is also possible to increase the amount of traveling air F that passes through the passing permitting frame part 15. Accordingly, it is possible to efficiently cool a part (for example, the vicinity of a battery, the vicinity of a motor, and the like) which is desired to be cooled.

Further, as in the embodiment described above, when the passing permitting frame part 15 is provided at a position that faces the ventilation surface of the heat exchanger such as the radiator, it is also possible to improve the cooling performance of the heat exchanger itself by the air ventilation at the fan OFF time.

Further, by providing the reinforcement rib 19 at the opening 17 of the passing permitting frame part 15, it is possible to improve the air ventilation through the opening 17 at the fan OFF time while increasing the strength of the passing permitting frame part 15.

Further, the strength reinforcement plate part 21 is integrally molded on the passing permitting frame part 15 at a lower position in the vertical direction of a portion that is surrounded by the reinforcement rib 19. Further, the strength reinforcement plate part 22 is integrally molded on the passing permitting frame part 15 at an arbitrary position of a portion that is surrounded by the outer circumference frame 16 and the reinforcement rib 19. Therefore, it is possible to enhance the rigidity of the fan shroud 10 by the strength reinforcement plate parts 21, 22. Further, the strength reinforcement plate parts 21, 22 may have a function as a distribution part for distributing power supply and control wirings (not shown) to the motor 40.

Modified Example

The present invention is not limited to the embodiment described above and includes embodiments which are variously changed from the above embodiment without departing from the scope of the present invention.

For example, it is also possible to set the direction of the deflection louver 20 to be straight in the axis line direction.

Further, the deflection louver 20 of the embodiment described above may be provided separately from the reinforcement rib 19 and may be provided such that it is possible to change the direction of the deflection louver 20. When allowing the direction of the deflection louver 20 to be capable of being changed, by adjusting the direction of the deflection louver 20, it is possible to efficiently guide the traveling air which passes through the passing permitting frame part 15 in a required direction, for example, to a vehicle lower part so as to decrease the temperature inside the engine room and the like.

Further, in the embodiment described above, the strength reinforcement plate part 21 is integrally molded on the passing permitting frame part 15 at a lower position in the vertical direction of a portion that is surrounded by the reinforcement rib 19. Further, a case is described in which the strength reinforcement plate part 22 is formed on the passing permitting frame part 15 at a lower section in the vertical direction and at a somewhat higher position than the lower section of the portion that is surrounded by the outer circumference frame 16 and the reinforcement rib 19. However, at least one of the two strength reinforcement plate parts 21, 22 may be formed. Further, it is possible to form the strength reinforcement plate part 21 at an arbitrary position of the portion that is surrounded by the reinforcement rib 19. Further, it is possible to form the strength reinforcement plate part 22 at an arbitrary position of the portion that is surrounded by the outer circumference frame 16 and the reinforcement rib 19. Further, the two strength reinforcement plate parts 21, 22 may have a function as a distribution part for distributing power supply and control wirings (not shown) to the motor 40.

Further, the above embodiment is described using an example in which the deflection louver 20 is formed in a plate shape and is bent and formed of the first louver part 20a and the second louver part 20b. However, the embodiment is not limited thereto, and the deflection louver 20 may be formed as described below.

Figure 7:
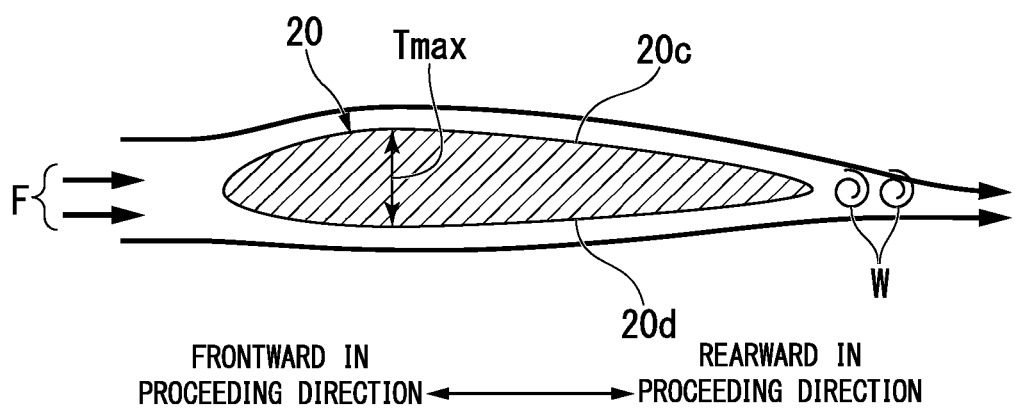
FIG. 7 is a cross-sectional view along a proceeding direction and a vertical direction showing a deflection louver in a modified example of the embodiment of the present invention.

FIG. 7 is a cross-sectional view along the proceeding direction and the vertical direction showing a modified example of the deflection louver 20.

As shown in FIG. 7, the thickness of the deflection louver 20 may be changed. That is, in the cross-sectional shape along the proceeding direction, the maximum thickness Tmax of the deflection louver 20 may be set at a more frontward position in the proceeding direction than the middle position in the proceeding direction. In this case, the deflection louver 20 is formed such that, in the cross-sectional shape along the proceeding direction, the thickness is gradually reduced from the position at the maximum thickness Tmax toward frontward and rearward directions in the proceeding direction.

In such a configuration, when the traveling air F passes through the deflection louver 20, the traveling air F smoothly passes on a wing upper surface 20c and a wing lower surface 20d. Therefore, the detachment of the traveling air F and the occurrence of a turbulence flow at the middle position in the proceeding direction of the wing upper surface 20c and the wing lower surface 20d are prevented. That is, it is possible to prevent the occurrence of the turbulence flow at the rearward position in the proceeding direction of the deflection louver 20. As a result, it is possible to improve the passing-through property of the traveling air F in the passing permitting frame part 15, and it is also possible to increase the amount of traveling air F that passes through the passing permitting frame part 15.

INDUSTRIAL APPLICABILITY

According to the cooling-fan-apparatus fan shroud described above, even at a fan OFF time, by the blowing-through of the traveling air, it is possible to deliver a sufficient amount of air to a required position, and it is possible to enhance the cooling effect. Further, by the setting of the position and the direction of the deflection louver, it is possible to control the flowing direction of the traveling air.

DESCRIPTION OF THE REFERENCE SYMBOLS 1A, 1B: cooling fan apparatus
10: fan shroud
12: cover wall
13: circular opening part
15: passing permitting frame part
17: opening
18a, 18b: attachment part
19: reinforcement rib (deflection louver)
20: deflection louver
20a: first louver part
20b: second louver part
21, 22: strength reinforcement plate part
100: vehicle
102: heat exchanger
110: cooling fan apparatus

The invention claimed is:

1. A cooling fan apparatus that is attached to a vehicle and that generates, by a rotation of a fan, forcing cooling air which passes through a heat exchanger that is arranged at a front part of a vehicle, the cooling fan apparatus comprising:
a fan shroud having:
a cover wall that has a circular opening part at which the fan is arranged at a center and that closes a space between the heat exchanger and a circumference of the fan by covering most of a ventilation surface of the heat exchanger;
an attachment part that is provided on an outer side of the cover wall and that fixes the cover wall to the vehicle; and
a passing permitting frame part that is positioned between the fan and the attachment part and that allows free passing of traveling air which flows from a frontward direction to a rearward direction in accordance with traveling of the vehicle; and a motor that is supported at a center of the circular opening part of the fan shroud and at a more rearward position in a proceeding direction of the vehicle than the cover wall via a plurality of stays,
wherein a deflection louver that guides a flow of the traveling air to a radial direction of the fan shroud is provided on the passing permitting frame part, and
the flow of the traveling air that is guided by the deflection louver is directed towards the motor that is arranged proximate to the center of the circular opening part of the fan shroud.

2. The cooling fan apparatus according to claim 1,
wherein the deflection louver is formed in a plate shape, and
a cross-sectional shape along a proceeding direction of the vehicle is formed so as to extend to be directed along the proceeding direction at a frontward position in the proceeding direction and so as to be bent and extend to be directed along a direction that crosses with the proceeding direction from a middle position in the proceeding direction.

3. The cooling fan apparatus according to claim 1,
wherein the deflection louver is formed in a plate shape and is formed such that, in a cross-sectional shape along a proceeding direction of the vehicle, a thickness is set to be maximized at a more frontward position in the proceeding direction than a middle position in the proceeding direction, and a thickness is gradually thinned from the position at the maximum thickness toward frontward and rearward directions in the proceeding direction.

4. The cooling fan apparatus according to claim 1,
wherein the passing permitting frame part is provided at a position that faces a ventilation surface of the heat exchanger.

5. The cooling fan apparatus according to claim 1,
wherein the passing permitting frame part is formed in a frame shape that includes, on an inner side, an opening which allows the traveling air to pass,
a reinforcement rib is provided at the opening so as to intersect the opening, and
at least part of the reinforcement rib is configured as the deflection louver that guides the traveling air which passes through the opening to a predetermined direction.

6. The cooling fan apparatus according to claim 5,
wherein a strength reinforcement plate part is provided on a portion of a part that is surrounded by a plurality of the reinforcement ribs and a portion of a part that is surrounded by a plurality of the reinforcement ribs and an outer circumference frame portion of the passing permitting frame part.

7. The cooling fan apparatus according to claim 2,
wherein the passing permitting frame part is provided at a position that faces a ventilation surface of the heat exchanger.

8. The cooling fan apparatus according to claim 3,
wherein the passing permitting frame part is provided at a position that faces a ventilation surface of the heat exchanger.

9. The cooling fan apparatus according to claim 2,
wherein the passing permitting frame part is formed in a frame shape that includes, on an inner side, an opening which allows the traveling air to pass,
a reinforcement rib is provided at the opening so as to intersect the opening, and at least part of the reinforcement rib is configured as the deflection louver that guides the traveling air which passes through the opening to a predetermined direction.

10. The cooling fan apparatus according to claim 3, wherein the passing permitting frame part is formed in a frame shape that includes, on an inner side, an opening which allows the traveling air to pass, a reinforcement rib is provided at the opening so as to intersect the opening, and at least part of the reinforcement rib is configured as the deflection louver that guides the traveling air which passes through the opening to a predetermined direction.

11. The cooling fan apparatus according to claim 4, wherein the passing permitting frame part is formed in a frame shape that includes, on an inner side, an opening which allows the traveling air to pass, a reinforcement rib is provided at the opening so as to intersect the opening, and at least part of the reinforcement rib is configured as the deflection louver that guides the traveling air which passes through the opening to a predetermined direction.

12. The cooling fan apparatus according to claim 7, wherein the passing permitting frame part is formed in a frame shape that includes, on an inner side, an opening which allows the traveling air to pass, a reinforcement rib is provided at the opening so as to intersect the opening, and at least part of the reinforcement rib is configured as the deflection louver that guides the traveling air which passes through the opening to a predetermined direction.

13. The cooling fan apparatus according to claim 8, wherein the passing permitting frame part is formed in a frame shape that includes, on an inner side, an opening which allows the traveling air to pass, a reinforcement rib is provided at the opening so as to intersect the opening, and at least part of the reinforcement rib is configured as the deflection louver that guides the traveling air which passes through the opening to a predetermined direction.

14. The cooling fan apparatus according to claim 1, wherein a cross-sectional shape of the deflection louver along a proceeding direction of the vehicle comprises:

a first louver part formed in a planar shape and formed so as to extend to be directed along the proceeding direction at a frontward position in the proceeding direction; and a second louver part formed in a planar shape and formed so as to be angled with respect to the proceeding direction and to extend along a direction that crosses with the proceeding direction from a middle position in the proceeding direction, wherein the first louver part and the second louver part are integrally molded to form the deflection louver and the first louver part and the second louver part join at an angle.

* * * * *